United States Patent Office 3,758,418
Patented Sept. 11, 1973

3,758,418
PROCESS FOR PREPARING A SUPPORTED CATALYST
William J. Leonard, Jr., San Francisco, and Howard V. Holler, Oakland, Calif., assignors to Shell Oil Company, New York, N.Y.
No Drawing. Filed Mar. 22, 1971, Ser. No. 126,983
Int. Cl. B01j 11/08, 11/22
U.S. Cl. 252—464
7 Claims

ABSTRACT OF THE DISCLOSURE

Supported catalysts are prepared by coating a support with polymerized ethylenically unsaturated carboxylic acid, contacting the coated support with ions of catalytically active metals and then heating to 100–450° C. to decarboxylate the polymerized acid and convert the metal ions into discrete less than 1000 A. particles of metal or metal oxide. Silver catalysts active and selective for ethylene oxide production are prepared by this process.

BACKGROUND OF THE INVENTION

Field of the invention.—This invention relates to supported catalysts and a process for their production. More particularly, it relates to a process for depositing catalytic metals or metal oxides on catalyst support surfaces in the form of minute (less than 1000 A.) discrete particles.

The prior art.—Supported catalysts consist of minor amounts of catalytically active substances, i.e., certain active metals or their compounds, distributed on the surfaces of a non-catalytic support. A variety of techniques have been developed for the deposition of catalytic substances on support surfaces. Certain methods produce uniform continuous deposits of catalytic substances while others, like the present invention, produce a particulate deposit.

One method for preparing a particulate deposit catalyst is described in McKim and Cambron, Canadian Journal of Research vol. 27, sec. b (1949), No. 11, pages 813–827. In this method, first, fine crystals of a decomposable salt of a catalytic metal are formed, in particular, silver oxalate. These crystals are then thermally decomposed to give a fine powder of metallic silver. A paste is then formed from this metallic powder and a binder and applied to the surfaces of a suitable support. A variation of this technique is disclosed in U.S. Pat. 3,043,854, issued July 10, 1962, to Endler. In this process, fine crystals of a decomposable metal compound (silver carbonate) are formed and applied as a slurry to the catalyst support surface. After drying, the decomposable crystals are thermally decomposed to fine particles of metal. In both these techniques, the particle size of the final catalytic material is dependent upon the crystal size of the decomposable salt. For this reason, it is often difficult or impossible to obtain a small catalytic particle size, such as below 1 micron. These processes have the further disadvantage of not effectively evenly covering the inner surfaces of complex or porous supports. Also, catalytic particles produced by these processes are not firmly attached to the support.

Another process for forming particulate catalyst deposits involves covering a support with a solution of a decomposable salt of the catalytic metal and then evaporating the solvent, thereby causing the decomposable salt to deposit as crystals on the surfaces of the support. These crystals are then thermally decomposed. Such a process gives an even coating of inner and outer surfaces of porous supports. Like the other known techniques, however, it depends upon the formation of discrete crystals of decomposable salt to give a particulate deposit and thus, is often unable to form particulate catalytic deposits having diameters below about 1 micron (10,000 A.).

STATEMENT OF THE INVENTION

It has now been found that supported metal or metal oxide catalysts having this metal or metal oxide present as particles having diameters of less than 1000 A. are prepared by the process which comprises the steps of (A) coating the surfaces of a catalyst support with amorphous polymerized ethylenically-unsaturated carboxylic acid, (B) contacting at moderate temperature the polymerized acid-coated support with a solution of ions of one or more catalytically active Group IIIb–Va metals in a solvent which does not appreciably remove the polymerized acid, and (C) heating the ion-containing coated support at a temperature in the range of from about 100° C. to 450° C. for a period sufficient to decarboxylate the amorphous polymerized acid and convert the metal ions into discrete particles of metal or metal oxide.

In a preferred application, this invention is used to prepare novel silver-on-alumina catalysts containing from about 2% by weight to about 15% weight of silver in the form of discrete particles having an average diameter of not greater than 1000 A. These catalysts are most useful in the production of ethylene oxide by direct oxidation of ethylene, having high activity and giving high oxidation selectivity to ethylene oxide.

DETAILED DESCRIPTION OF THE INVENTION

The polymeric acid coating.—In the first step of the catalyst preparation process of this invention, a catalyst support is coated with an amorphous polymerized unsaturated carboxylic acid, for example, polyacrylic acid. The unsaturated carboxylic acid may be applied to the support as a monomer and then polymerized on the support surface or it may be applied to the surface in an already polymerized form. Suitable polymeric acids include polymers of hydrocarbon carboxylic acids of up to 10 carbon atoms possessing at least one carboxy group and at least one ethylenic linkage, i.e., a non-aromatic carbon-carbon double bond. The acids may also contain additional carbon-carbon unsaturation in the molecules, such as, aromatic unsaturation. Suitable acids include, for example, vinylhydrogenphthalate, vinyl benzoic acid, acrylic acid and maleic acid. Preferred polymeric acids are polymers of lower alkenoic acids which contain from 1 to 2 carboxy groups, from 1 to 2 ethylenic linkages as the sole carbon-carbon unsaturation in the molecule, and contain from 3 to 6 carbon atoms including carboxy carbon atom(s).

Illustrative of monocarboxylic alkenoic acids of this type, from which suitable polymeric acids can be prepared, are acrylic acid, methacrylic acid, crotonic acid, 3-pentenoic acid, sorbic acid, 2-methyl-2-butenoic acid and ethacrylic acid, while illustrative dicarboxylic alkenoic acid from which suitable polymers can be made include maleic acid, fumaric acid, citraconic acid, mesaconic acid, itaconic acid, 2-methyleneglutaric acid and 2-pentendioic acid. Carboxylic alkenoic acids wherein the ethylenic linkage is conjugated with the carboxy group and is a terminal ethylenic linkage are very suitable. Most preferred are polymers of acrylic acid and the alpha-alkyl derivatives thereof wherein the alkyl has from one to three carbon atoms, particularly one carbon atom, i.e., methacrylic acid.

It is essential that this acid be in polymeric form prior to combination with the metal ions in the second step. If the acid is applied in a monomeric form it may be polymerized in accord with the well-known methods of polymerization, that is, for example by heating in the presence of a polymerization catalyst, such as benzoyl peroxide or other peroxide catalysts. Suitably, the acid is polymerized to an average molecular weight of at least 500.

The upper limit on average molecular weight is not critical. Polymerized acids having an average molecular weight of up to about 2,000,000 can be employed. Polymerized acids of average molecular weight of from about 2,000 to 500,000 are preferred, giving excellent catalysts and having generally low viscosities which provide handling advantages.

Whether added as polymer or monomer, the acid is generally added as a dilute solution in a suitable inert solvent. This solvent is not critical, being removed before the next process step. Examples of suitable solvents include polar substituted hydrocarbons, for example oxygenated hydrocarbons, such as alcohols, ketones and cyclic ethers, preferably of from 1 to 6 carbon atoms. Illustrative of such solvents are methanol, isopropanol, ethylene glycol, dioxane, tetrahydrofuran, as well as other substituted hydrocarbons such as, dimethylsulfoxide and the like. Most preferred solvents are the lower oxyhydrocarbons, including monoalkanols of from 1 to 3 carbon atoms, tetrahydrofuran and dioxane. This solvent is removed by conventional techniques such as heat or vacuum, prior to the addition of the metal ions.

The amount of polymeric acid employed can vary widely. Generally, additions of from about 1% by weight to about 40% by weight, based on the total supported catalyst weight are suitable, with additions of from about 2% by weight to about 30% by weight being preferred. With highly porous supports it is preferred to employ from about 8% by weight to about 30% by weight, with less porous supports additions of from about 2% to about 20% by weight are preferred.

The polymeric acid may be applied to the support surface by any suitable method. For example, the support may be dipped in the polymeric acid solution, or may be sprayed with the solution. Similarly, the conditions during application of the polymeric acid coating are not critical, any convenient temperature being suitable, for example.

The metals and their addition.—Ions of at least one metal are added to the polymeric acid coating on the catalyst support. Suitable metals include the catalytically active metals found in Groups IIIb–Va of the Periodic Table of the elements as shown in the 49th edition of the Chemical Rubber Corporation Handbook of Chemistry and Physics. The suitable metals therefore include the group known as the transition metals, that is, the metals in periodic sequence from scandium to zinc, from yttrium to cadmium, and lanthanum to mercury; the metals of Group IIIa, aluminum, gallium, indium and thallium; as well as the catalytic metals of Group IVa, i.e., silicon, germanium, and tin; and the Group Va metals, arsenic, antimony and bismuth. Of these metals, the catalytically active metals of Groups IVb–IIIa are particularly preferred with the metals aluminum, titanium, chromium, iron, cobalt, nickel, copper, zinc, zirconium, palladium, platinum, and silver being most preferred. Mixtures of metals may also be employed.

The metals are contacted with the polymeric acid-coated supports in the form of electropositive metal ions. For example, nickel is added as $Ni^{II}$, copper as $Cu^I$ or $Cu^{II}$, silver as $silver^I$, $tin^{IV}$ as Ti and aluminum as $Al^{III}$.

Since the metal ions are contacted with the polyacid-coated support in a non-aqueous medium, the metal must be in the form of salts or complexes which are soluble in the non-aqueous media. Examples of such salts and complexes are salts of carboxylic acids, such as formates, acetates, butyrates, hexanoates, adipates and citrates; alcoholates, such as ethylates, propylates, hexylates and phenylates; complexes, such as acetylacetanoates; the soluble salts of mineral acids, such as $H_2PtCl_6$, $AgNO_3$ and $CuCl_2$; and metal alkyls, such as diethylzinc and tetramethyltitanium.

As solvent for this solution are used liquids which will not appreciably extract the polyacid coating off of the support. Suitable solvents include acetone, acetonitrile, propylene carbonate, benzene, sulfolane, tertiary butyl alcohol and their mixtures. These solutions are generally relatively dilute, preferably having concentrations in the range of from about 0.05 to about 3 equivalents of metal ion per liter.

The metal ion solution is contacted with the polymeric acid-coated support at ambient temperature or, if desired, moderately elevated temperatures, such as up to about 100° C. The metal ion solution is allowed to contact the coated support for a period long enough to permit the ions to react with the polymeric acid. Contacting times as short as 5–10 minutes and as long as 24 hours have given good catalyst products.

Solvent removal.—The product which results from the contacting of the polyacid-coated support with the metal ion-containing solution is a support coated with an amorphous metal ion-polyacid catalyst intermediate. This coated product is removed from excess metal ion solution by conventional techniques such as sieving, decanting and the like. If desired, residual solvent can be removed from the metal ion-polyacid-coated product. This solvent removal is somewhat optional. It is, except for matters of degree, similar to the thermal decarboxylation which follows to produce the final catalyst product. It is, therefore, possible to combine the residual solvent removal with the thermal decarboxylation step by directly exposing the solvent-containing amorphous metal ion-polyacid coated intermediate product to decarboxylation conditions. Such a practice leads to suitable catalysts but can present certain hazards as often flammable organic solvents are exposed to high tempertures. It is generally preferred to stepwise remove residual solvent and then decarboxylate.

The decarboxylation.—The particulate-deposit supported catalyst products of this invention are prepared by heating the polyacid-metal ion coated supports to a temperature in the range of from about 100° C. to 450° C. At temperatures within this range the polyacid salt decarboxylates to afford a substantially carbonaceous organic matrix. The metal ions are simultaneously converted into tiny particles of either catalytic metals or metal oxides. It is preferred to carry out the decarboxylation at temperatures in the range of 150° C. to 450° C. The optimum temperature is dependent on the metals present. For example, where silver is present as the only metal, temperatures of from 175° C. to 250° C. are most preferred; with aluminum, 275° C. to 450° C.; with zinc 275° C. to 375° C.; with nickel, from 250° C. to 350° C.; with palladium and aluminum from 125° C. to 200° C. to give palladium metal or up to about 450° C. to give palladium metal and $Al_2O_3$.

Whether metal oxides or metals are formed by the process depends on both the environment of the thermal decarboxylation and the metals involved. The decarboxylation can be carried out in an oxygen-containing environment, for example, in air; in an inert environment such as in nitrogen or argon or in a vacuum; or in a reducing atmosphere such as hydrogen. With most of the metals employed, oxide particles are formed if an oxygen-containing environment is employed. It is recognized, however, that with gold, silver, mercury and the platinum metals, any oxide formed is unstable and thus may spontaneously decompose at the decarboxylation conditions to give metal, even with an oxygen environment. With active metals, that is metals having a standard oxidation potential, as reported in W. M. Latimer, The Oxidation States of the Elements and Their Potentials in Aqueous Solutions (1938), higher than about 0.4 v. such as chromium, zinc, aluminum, and titanium, oxide particles are formed even in the substantial absence of an oxygen-containing environment. These metals apparently abstract oxygen from the starting polyacid material during the decarboxylation to form oxides.

The less active metals, that is metals having an oxidation potential lower than about 4.0 v. for example, copper, nickel, and cobalt, form particles of metallic metals, in an inert atmosphere, in a vacuum, or in a reducing atmosphere.

When preparing metal particles in a vacuum it is very suitable to employ absolute pressures up to about 100 mm. of mercury. The exact pressure selected within this range is not critical.

The length of time required to decompose the polymeric acid-metal coating in part depends on the temperature employed. Times of up to about 12 hours are generally suitable. When silver is present as the only metal in the polymeric acid-metal coating, decomposition times of from 2 to 12 hours are preferred.

The catalyst products

The products of this invention are supported catalysts. They comprise an inert support having on its surfaces particulate deposits of catalytic metals or oxides. Catalyst supports which may be used in the preparation of these products in their broadest aspects can be selected from the large number of conventional porous refractory catalyst carriers or supports. Such conventional support materials may be of natural or synthetic origin and of microporous or macroporous structure. They may have structures which give relatively low surface areas, such as below about 10 m.$^2$/g. or they may have higher surface areas such as up to about 1000 m.$^2$/g. Specific examples of suitable supports include aluminum oxides, charcoal, pumice, magnesia, zirconia, kieselguhr, fuller's earth, silicon carbide, fire brick, selected clays, artificial and natural zeolites, ceramics, etc. They may be in the form of small particles suitable for fluidized bed applications or they may be in the form of chunks, pellets and the like suitable for use in fixed beds.

While the process of this invention is generally applicable and is not limited to use with certain support materials, the specific materials employed will, to a major extent, be controlled by the type of catalyst being prepared and its application.

The catalysts prepared by the process of this invention preferably contain from 1 to 30% by weight (based on total catalysts) of catalytically active metal or metal oxide deposited evenly on the interior (pore) and exterior surfaces of the support. Most preferably, they contain from 1.5 to 20% by weight of catalytically active metal or metal oxide on the same basis. The catalytic material is present as tiny individual particles, generally of diameters less than 1000 A. and most commonly of diameters of from about 50 A. to 500 A. It is possible that even smaller catalytic particles are being produced by the process of the invention. However, present X-ray analytical techniques cannot detect particles smaller than about 50 A. with any degree of certainty. These particles are tightly bound to the support surface, not being easily abraded or dislodged.

Specific catalyst products

*Ethylene oxide catalysts.*—Novel catalysts which give excellent results as catalysts for the direct oxidation of ethylene to ethylene oxide can be prepared by the process of this invention. These catalysts comprise an inert, low surface area porous support evenly covered with from 2 to 15% by weight, based on total catalyst, of uniform, discrete particles of silver having average diameters of from 50 A. or less to about 500 A. Suitable supports have surface areas below about 10 m.$^2$/g. and preferably not greater than about 2 m.$^2$/g. These preferred support materials typically have an apparent porosity of greater than about 20% and preferably comprise aluminous materials, in particular, alpha-alumina. Most preferred alpha-alumina support for silver ethylene oxidation catalysts are in the form of tablets, rings, pellets, etc., having specific surface areas of from about 0.03 m.$^2$/g. to about 2.0 m.$^2$/g. and apparent porosities of from about 25% to 50% by volume. When ethylene oxidation catalysts are prepared with these supports, using the process of this invention; a uniform deposit of particulate silver having an average particle diameter of from 50 A. or less to 500 A., is achieved on the inner and outer surfaces of the catalyst support. Such a catalyst permits high yields of ethylene oxide at a given ethylene conversion and achieves this ethylene conversion at lower temperatures than are possible with conventional catalysts.

*Other catalysts.*—The present invention is of general applicability. A great variety of types of catalysts can be prepared by this process, for example, platinum reforming catalysts, nickel, cobalt and palladium hydrogenation catalysts, tin and copper catalysts for oxidizing propylene to acrolein and palladium alcohol dehydrogenation catalysts.

The invention will be described by the following examples which are provided for illustration and are not to be construed as limiting the invention.

EXAMPLE I (A) Ten grams of 20–28 mesh commercial aluminum oxide (Norton Company's "Alundum" grade LA-5556) having a surface area of about 0.2 m.$^2$/g. was slurried with a solution of 2.0 g. of polyacrylic acid having an average mole weight of about 10,000 in 10 ml. of dioxane. The slurry was flooded with n-hexane to precipitate the polymer on the support and the resulting composite was vacuum dried near room temperature. The resulting solid was gently broken up and screened to obtain 11.5 g. of polymeric acid coated Alundum greater in size than 30 mesh. This was stirred in a solution of 3.4 g. of silver nitrite in 4 ml. of acetonitrile plus 10 ml. of benzene for 18 hours at 25° C. At the end of this time solids were filtered off, vacuum dried and rescreened to obtain 13.2 g. of 20–30 mesh solid. Thirteen grams of this was heated under a stream of nitrogen at atmospheric pressure as follows: 2.5 hrs. at 125° C., 15 hrs. at 170° C., 2.5 hrs. at 250° C., 2.5 hrs. at 300° C. and 1.5 hrs. at 400° C. The resulting grey-black solid contained 12.0% w. silver, 0.10% w. N, 1.6% w. C, and 0.09% w. H. By X-ray diffraction line broadening the crystallite size of the silver particles on the catalyst was estimated to be 200±50 A.

(B) A 5 mm. diameter by 12.6 cm. long stainless steel reaction tube was loaded with 3.5 g. of this supported silver catalyst. A mixture containing about 28% mole ethylene and 8% mole oxygen in 34% mole methane and 30% nitrogen was passed over the catalyst. A pressure of 15 kg./cm.$^2$ and a flow of about 100 ml./min., measured at atmospheric pressure, were maintained. At a reaction temperature of 203° C., 40% of the input oxygen was consumed and ethylene was converted to ethylene oxide with a selectivity of 76%.

EXAMPLE II

Ten grams of titanium dioxide (Degussa's Titanox P-25) is refluxed in dioxane, filtered and vacuum dried at 150° C. This support is then slurried with a solution of 0.72 g. of polyacrylic acid (molecular weight 100,000) in 150 ml. of methanol. Solvent is vacuum stripped and solids are resuspended in 150 ml. of toluene. To this mixture is added 1.0 g. of Ni(OAc)$_2$.4H$_2$O dissolved in 15 ml. of methanol plus 30 ml. of toluene. The titanium dioxide-toluene slurry is brought to reflux and the nickelous acetate solution is added over 10 minutes while removing methanol by distillation. Reflux and distillation is continued until about half the toluene has also been removed. The residual solvent is then vacuum stripped.

The white powdery product is slowly heated over 15 hours to 200° C. and held 2 hours at 300° C., 2 hours at 350° C. and 4 hours at 410° C. The residual 10.5 g. of powder would contain 2.2% w. Ni.

Four grams of this catalyst is stirred with a mixture of 50 ml. of 1-hexene plus 50 ml. of n-heptane under 35 kg./cm.$^2$ hydrogen pressure while warming. Some reaction exotherm is observed and after 30 minutes, when 70° C. has been reached, the theoretical amount of hydrogen has been taken up.

EXAMPLE III

Ten grams of 20–40 mesh alumina (Reynolds RA–1 grade alumina) was slurried in 20 ml. of methanol containing 1.3 g. of 10,000 M.W. polyacrylic acid. Solvent was stripped at 100° C. and 3 mm. Hg and the remaining solids screened to obtain 10.7 g. of material which was 20–40 mesh.

A solution of 0.71 g. $Sn(OAc)_2$ and 1.17 g. $UO_2(OAc)_2$ in 10 ml. of methanol plus 110 ml. of toluene was added to 8.6 g. of the acid coated support prepared above. Then the slurry was refluxed 15 min. before vacuum stripping the solvent. The brown product was screened to obtain 8.7 g. greater than 40 mesh and 1.2 g. less than 40 mesh.

Pyrolysis of 4.0 g. of the latter product which was greater than 40 mesh for 1 hour at 250° C., 3 hours at 300° C., 1 hour at 350° C. and 1 hour at 400° C. at 0.07 to .20 mm. Hg left 3.6 g. of black granular solid which contained 2.2% w. Sn and 2.9% U.

This catalyst is tested for the air oxidation of propylene to acrolein at 175° C. to 350° C. Acrolein is produced.

EXAMPLE IV

Fifty grams of 60–200 mesh silica gel (Davison grade 950) which had been dried 17 hrs. at 480° C. in an air stream was slurried with 3.6 g. of polyacrylic acid (molecular weight 10,000) dissolved in 50 ml. of methanol plus 100 ml. of acetone solvent was stripped under vacuum and the free-flowing solid which resulted was blown free of the very fine dust of non-adhering polyacrylic acid. A sample of this acid coated silica was titrated with NaOH and found to contain 0.83 meg of carboxylic acid/gm.

Twenty grams of this acid coated silica was slurried with a solution of 0.28 g. stannic chloride in 200 ml. of benzene. Half the benzene was distilled off to leave a light brown powder. To this benzene slurry a solution of 0.53 g. of $H_2PtCl_6 \cdot 4.5H_2O$ in 40 ml. of acetone was added in a dropwise fashion over 3 minutes. Then solvents were vacuum stripped.

The resulting Sn-Pt containing product was pyrolyzed at 0.2–1.0 mm. Hg pressure as follows: 4 hours at 200° C., 1 hour at 300° C., 1 hour at 360° C. and 4 hours at 390° C. A jet black granular solid resulted which contained 0.6% w. Sn and 1.0% w. Pt.

Passage of n-heptane over this catalyst at 500° C. produced benzene, toluene and higher aromatic products plus hydrogen.

EXAMPLE V

Twenty grams of 60–200 mesh silica gel (Davison grade 950) which had been dried 17 hours at 480° C. in a stream of air was mixed with a solution of 0.43 g. of polyacrylic acid (molecular weight 1,000,000) in 5 ml. of methanol plus 20 ml. of acetone. Solvent was stripped under vacuum. The resultant acid-coated silica was slurried in 100 ml. of toluene and a solution of 0.38 g. of zirconium tetrabutoxide in 40 ml. was added over 8 minutes. After an 18 hour reaction period, solvent was decanted and solids were ether-washed The soild was resuspended in ether and 0.51 g. of $H_2PtCl_6 \cdot 4.5H_2O$ dissolved in 40 ml. of acetone was added with stirring over 25 minutes. The ether was decanted and the pale orange solid was rinsed with ether and vacuum dried at 80° C.

A 13.25 g. portion of the resulting solid was heated over 5 hours to 175° C. and then heated 4 hours at 300° C., 2 hours at 340° C. and 0.5 hour at 370° C. The 12.3 g. of black solid remaining contained 0.24% w. Zr and 0.68% w. Pt.

Th latter pyrolyzed product was an active dehydrocyclization catalyst. When n-hexane and a half molar quantity of hydrogen were passed over this material at 525° C. using a weight hourly space velocity of 2, a 30% yied of benzene was obtained. The selectivity in the conversion of n-hexene to benzene was 60%.

EXAMPLE VI

Forty-one grams of 5–6 mesh Kaiser grade KA–101 alumina which had been dried at 50° C. in a vacuum for 2 hours was contacted with a solution of 40 g. of polyacrylic acid (MW~$10^4$) in 0.5 liter acetone-methanol (20% v. McOH). After a period of about 16 hours, the support was separated and dried at 50° C. on a vacuum. The coated product contained about 8% w. polyacid.

The product was subsequently equilibrated with excess $Cu(NO_3)_2 \cdot 3H_2O$ in acetone. After a period of 1–2 hours, individual pellets were sectioned and examined for eveness of color due to Cu(II) exchange. This color test indicated the polymer had homogeneously covered the internal surfaces of the alumina.

The Cu(II) exchanged pellets are heated to decarboxylate the polymer in a $N_2$ stream at 300° C. for 5 hours. Analysis of the decarboxylated material would show that it contains 6% w. Cu metal.

We claim as our invention:

1. A process for preparing a supported catalyst which comprises the steps of:
    (a) coating the surfaces of a catalyst support with amorphous polymerized ethylenically-unsaturated carboxylic acid monomer of up to 10 carbon atoms, said polymerized acid having an average molecular weight of from about 500 to about 2,000,000.
    (b) contacting the polymerized acid-coated support with a solution of metal ions of one or more catalytically active Group IIIb–Va metals in the form of non-aqueous media soluble salts or complexes in a solvent which does not remove the polymerized acid; said catalytically active Group IIIb–Va metals being selected from transition metals in the periodic sequences from scandium to zinc from yttrium to cadmium and from lanthanum to mercury, from the Group IIa metals aluminum, gallium, indium and thalium, from the Group IVa metals silicon, germanium, and tin, and from the Group Va metals arsenic, antimony and bismuth, and
    (c) heating the ion-containing coated support at a temperature in the range of from 150° C. to 450° C. for a period sufficient to decarboxylate the amorphous polymeric acid and convert the metal ions into discrete particles of metals or metal oxide.

2. The process in accordance with claim 1, wherein the amorphous acid is a polymerized alkenoic acid of from 3 to 6 carbon atoms.

3. The process in accordance with claim 2, wherein the metal ions are ions of catalytically active Group IVb–IIIa metals selected from the class consisting of aluminum, titanium, chromium, iron, cobalt, nickel, copper, zinc, zirconium, palladium, platinum and silver.

4. A process for preparing a supported silver catalyst which comprises the steps of:
    (a) coating the surfaces of an alumina catalyst support having a surface area not greater than about 2 m.²/g. with an amorphous polymerized monocarboxylic alkenoic acid monomer of from 3 to 6 carbon atoms, said polymerized acid having an average molecular weight of from about 500 to about 2,000,000,
    (b) contacting the polymerized acid-coated support with a solution of silver ion in the form of non-aqueous media soluble salts or complexes in a solvent which does not remove the polymerized acid, and
    (c) heating the silver ion-containing coated support at a temperature in the range of from 175° C. to 250° C. for from 2 to 12 hours.

5. A silver catalyst comprising from about 2% by weight to about 15% by weight of discontinuous, adherent, discrete particles of silver having a uniform diameter of less than about 1,000 A., substantially uniformly spaced on the exterior and pore surfaces of a porous inert refractory support having a surface area of from about 0.03 m.²/g. to 2.0 m.²/g.

6. The article in accordance with claim 5 wherein said refractory support has a major proportion of alpha-alumina and has an apparent porosity of from 25% to 50% by volume.

7. The article in accordance with claim 6 wherein said particles have an average diameter of from 50 A. to 500 A.

References Cited

UNITED STATES PATENTS

| | | | |
|---|---|---|---|
| 1,976,875 | 10/1934 | Connolly et al. | 252—463 X |
| 2,658,028 | 11/1953 | Haensel et al. | 252—466 P T |
| 3,377,269 | 4/1968 | Bloch | 252—477 R |
| 3,437,605 | 4/1969 | Keith | 252—463 |
| 3,492,148 | 1/1970 | Hervert | 252—463 X |

DANIEL E. WYMAN, Primary Examiner

W. J. SHINE, Assistant Examiner

U.S. Cl. X.R.

252—463, 465, 466 J, 466 PT; 260—348.5 R